(No Model.)
T. C. QUAYLE.
EMBALMER'S AND UNDERTAKER'S CABINET.
No. 308,431. Patented Nov. 25, 1884.
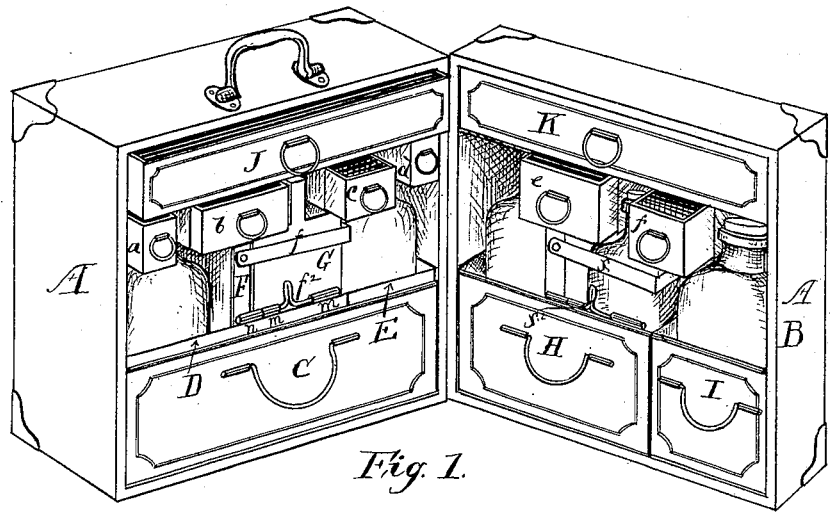
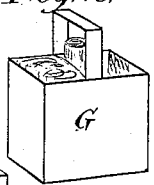
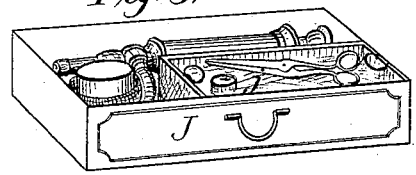
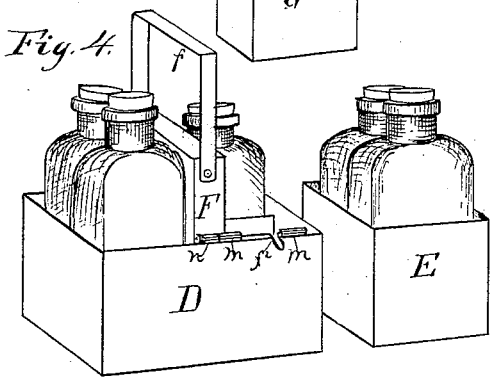
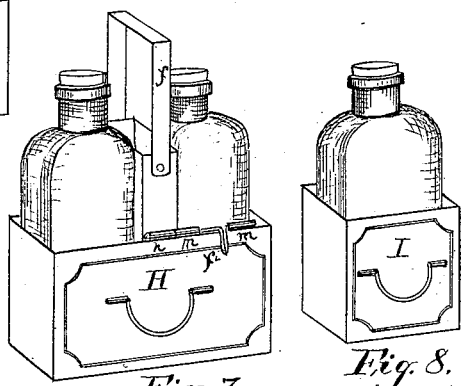
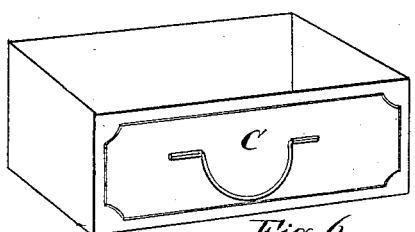
WITNESSES:
F. R. Tibbitts
E. W. Laird
INVENTOR
Thomas C. Quayle,
BY
Geo. W. Tibbitts,
ATTORNEY

UNITED STATES PATENT OFFICE.

THOMAS CLEATOR QUAYLE, OF CLEVELAND, OHIO.

EMBALMER'S AND UNDERTAKER'S CABINET.

SPECIFICATION forming part of Letters Patent No. 308,431, dated November 25, 1884.

Application filed April 25, 1884. (No model.)

*To all whom it may concern:*

Be it known that I, THOMAS C. QUAYLE, of Cleveland, in the county of Cuyahoga and State of Ohio, have invented certain new and useful Improvements in Embalmers' and Undertakers' Cabinets, of which the following is a specification.

This invention has for its object to provide a cabinet for embalmers and undertakers in which all the material, implements, and articles necessary for their use are contained in convenient and compact form, rendering the stowage and transportation of same in a simple, expeditious, and neat manner.

In the accompanying drawings, Figure 1 is a perspective view of my improved cabinet standing open, showing the tills, drawers, pans, and trays containing bottles and other articles in place. Figs. 2, 3, 4, 5, 6, 7, and 8 show the several pans, trays, and drawers removed as when required for use of material and implements.

A is a rectangular box, of dimensions convenient for the stowage of all the material and implements or instruments necessary for an embalmer's or undertaker's use for the performance of the duties in preparing a corpse for the tomb. A box twelve inches high, twelve inches in width, and eight or nine inches deep has ample capacity for carrying one gallon of liquid preparation and all the tools, implements, and material required. This box I make of fine wood, neatly finished, with corners protected by metal corner-pieces, and provided with a convenient handle for carrying. Said box is divided into two parts, one part, B, of which is about one-third the depth of the other part, A, and hinged thereto. In the bottom of part A is fitted a tray or deep pan, C, and fitted to stand within this pan C are two other pans, D and E. In the middle part of pan D is fitted a narrow removable compartment, F, provided with a bail, $f$, by which the said pan and its contents may be handled or carried. The compartment F is held in place by push-bolts $f^2$. The pan or tray D is of sufficient capacity to hold three one-pint bottles and a box or shaving-cup, G, containing soap and brush, and beneath this cup is a compartment for a sponge. The pan E also holds two one-pint bottles. In the part B of the box are also fitted two pans or trays, H and I. These are of like character to the pans D and E, but of less capacity, and holding three bottles. This provides for eight pint bottles. I prefer the pint bottles for carrying the liquid for the reason that they are more convenient, and, further, in the embalming process sufficient time should be given for the liquid to diffuse itself throughout the body; hence a small quantity at a time only should be injected, so that to carry the liquid in small packages is preferable.

In the top of each of the parts A and B are fitted removable drawers or trays J K, to hold various instruments and tools. In the drawer J is contained a force-pump and hose, and a compartment, $j$, for holding knives and other tools. Below the said drawers are fitted small drawers or tills $a\ b\ c\ d\ e\ f$, sliding in pigeon-holes provided for their reception, for holding needles, pins, and other small articles, as lint, thread, &c.

From the foregoing it will be seen that this makes a very compact, convenient, and perfect cabinet to contain all the needed paraphernalia of the embalmer and undertaker. The pans C, D, H, E, and I are useful for holding water, and for washing and cleansing tools, implements, &c., when the work is done and the several articles are again replaced.

Having described my invention, I claim—

The improved cabinet for embalmers' and undertakers' use, consisting of the divided box A B, provided with the pans, trays, tills, bottles, &c., for holding the materials, instruments, and tools, when constructed, combined, and arranged substantially as described, and for the purpose set forth.

THOMAS CLEATOR QUAYLE.

Witnesses:
GEO. W. TIBBITTS,
JAMES QUAYLE.